(12) United States Patent
Li et al.

(10) Patent No.: US 9,833,935 B2
(45) Date of Patent: Dec. 5, 2017

(54) MOLD STRUCTURE HAVING LIGHTWEIGHT MODULE

(71) Applicant: DELTA ELECTRONICS (Dongguan) CO., LTD., Dongguan (CN)

(72) Inventors: Haifeng Li, Dongguan (CN); Fuen Guo, Dongguan (CN); Qinghua Yuan, Dongguan (CN)

(73) Assignee: DELTA ELECTRONICS (DONGGUAN) CO., LTD., Dongguan (CN)

( * ) Notice: Subject to any disclaimer, the term of this patent is extended or adjusted under 35 U.S.C. 154(b) by 304 days.

(21) Appl. No.: 14/704,120

(22) Filed: May 5, 2015

(65) Prior Publication Data

US 2015/0328814 A1    Nov. 19, 2015

(30) Foreign Application Priority Data

May 19, 2014   (CN) ..................... 2014 2 0257323 U

(51) Int. Cl.
*B29C 45/26* (2006.01)
*B29C 45/36* (2006.01)
*B22D 17/22* (2006.01)

(52) U.S. Cl.
CPC ........ *B29C 45/2675* (2013.01); *B22D 17/229* (2013.01); *B29C 45/36* (2013.01); *Y10T 29/49948* (2015.01)

(58) Field of Classification Search
CPC .... B22D 17/229; B29C 45/2675; B29C 45/36
See application file for complete search history.

(56) References Cited

U.S. PATENT DOCUMENTS

| | | | | |
|---|---|---|---|---|
| 6,120,279 A * | 9/2000 | Vovan | ................. | B29C 45/2675 425/190 |
| 8,118,580 B2 * | 2/2012 | Wu | ................... | B29C 45/14065 425/127 |
| 2004/0001901 A1 * | 1/2004 | Towery | ............... | B29C 45/2673 425/190 |
| 2004/0076701 A1 * | 4/2004 | Lai | ........................ | B29C 45/062 425/130 |
| 2005/0175727 A1 * | 8/2005 | Yang | .................. | B29C 45/2675 425/195 |
| 2008/0248151 A1 * | 10/2008 | Chen | ................... | B29C 45/2675 425/192 R |

* cited by examiner

*Primary Examiner* — James Sanders
(74) *Attorney, Agent, or Firm* — Hauptman Ham, LLP

(57) ABSTRACT

A mold structure and the replacement method thereof. The mold structure has a lower molding plate, at least one lower die core, a plurality of lower supporters, a plurality of first positioning units, an upper molding plate, at least one upper die core, a plurality of upper supporters and a plurality of merging units. The upper die core and the lower die core are passed through by a plurality of fasteners, and fixed on the upper molding plate and the lower molding plate respectively. The upper supporters and the lower supporters are disposed around the upper die core and the lower die core respectively, and passed through by a plurality of fasteners to fix them on the upper molding plate and the lower molding plate respectively. A part of a first positioning unit protruding out of a lower supporter is inserted into a merging unit. The present invention provides an accurate way to fix die cores, improves procedures in conventional molding, further reduces process time and saves cost.

12 Claims, 9 Drawing Sheets

MOLD STRUCTURE HAVING LIGHTWEIGHT MODULE

BACKGROUND OF THE INVENTION

Field of the Invention

The present invention relates to a mold structure, and especially to a mold structure able to replace a die core rapidly, and reduce process time. The present invention further relates to a replacement method of a mold structure.

Description of Related Art

A mold is an essential device for high quantity manufacturing in the industry, and widely used in precision manufacturing with high quality. Materials including metal, plastic, rubber, glass and mineral, can be formed into a product with a specific shape by using a mold in the processes including stamping, forging, casting or injection. Generally, a lot of products or tools are produced with molding. For example, a mechanical component is made by a mold, and then is assembled into sophisticated mechanical devices such as a bicycle, a sewing machine or a car. A mold has broad application in various fields including precision mechanics, computer and electronic products, photo-electricity technology and medical treatment, and the application is becoming novel and diversified with the improvement of the technology and increasing demand.

In the present technology, a mold includes one molding plate and at least one die core. The molding plate has a cavity going across the molding plate and corresponding to the die core. A forming portion is formed on top of the die core with a shape corresponding to the shape of a product fabricated after molding. The die core has to be disposed in the cavity and fastened from the back of the molding plate before the mold is processed with injection molding. Generally, mold testing is first carried out before a mold is processed with injection molding to ensure the accuracy of injection molding. During mold testing, a serial of modification to the shape of the die core is necessary for the final fabricated product in conformity with the expected shape.

The die core used for injection molding is disposed in the cavity. The molding plate has to be taken apart so as to modify the die core. Screws are detached from the back of the molding plate, then the die core is taken out from the cavity for shape modification. The die core is disposed back into the cavity after modification, and the molding plate is assembled to the mold. If one modification does not meet the requirement, it is necessary to take apart the molding plate and take out the die core once again until the result of mold testing is optimal. Obviously, repeatedly disassembling the molding plate to take out the die core for modification is complex, fatigue-inducing and time-consuming. In addition, the cavity must have a shape with high precision to accommodate the die core and also requires a high precision mechanical process. Therefore, the procedure of fabricating molds is complex, the process quality is hard to control and the process time is hard to reduce.

In view of the aforementioned drawbacks of conventional molding, the inventor of the present invention, based on years of extensive research and experience in the related industry, developed a die core structure in accordance with the present invention to overcome the drawbacks of the prior art.

SUMMARY OF THE INVENTION

The following summary is related to abbreviated introduction of the present invention, to provide basic concept of the present invention in certain respects. It should be understood, this abbreviated introduction is not an exhaustive summary of the present invention, and is not intended to determine critical or essential part of the present invention or limit the scope of the present invention. It only provides a concept in abbreviation to act as a preface to the detail description as follow.

Accordingly, an object of the present invention is to provide a mold structure, which reduces time wasted during mold testing, to satisfy high precision as requested and to improve inconvenience for the conventional molding, and thus, the present invention provides a mold structure of reduced fabricating time, low cost and improve convenience.

For this purpose, the invention provides a mold structure, including: a lower molding plate; at least one lower die core, being passed through by a plurality of fasteners, and fixed on the lower molding plate by driving the fasteners; a plurality of lower supporters, being disposed around the lower die core, passed through by a plurality of fasteners, and fixed on the lower molding plate by driving the fasteners; a plurality of first positioning units, being fixed at the lower supporters, and protruding out of the lower supporters; an upper molding plate, opposite to the lower molding plate; at least one upper die core, being passed through by a plurality of fasteners, fixed on the upper molding plate by driving the fasteners, and opposite to the lower die core; a plurality of upper supporters, being disposed around the upper die core, passed through by a plurality of fasteners, and fixed on the upper molding plate by driving the fasteners; and a plurality of merging units, being fixed at the upper supporters; wherein the upper supporters are opposite to the lower supporters and in contact with the lower supporters respectively, and the part of the first positioning unit protruding out of the lower supporter is inserted into the merging unit during assembly.

To achieve the aforementioned objective, the present invention provides a replacement method of a mold structure, including: (a) providing an upper molding plate opposite to a lower molding plate; (b) at least one lower die core being disposed on the lower molding plate, passed through by a plurality of fasteners, and fixed on the lower molding plate by driving the fasteners; at least one upper die core being disposed on the upper molding plate, passed through by a plurality of fasteners, and fixed on the upper molding plate by driving the fasteners; (c) a plurality of lower supporters being disposed around the lower die core, passed through by a plurality of fasteners, and fixed on the lower molding plate by driving the fasteners; a plurality of upper supporters being disposed around the upper die core, passed through by a plurality of fasteners, and fixed on the upper molding plate by driving the fasteners; (d) a plurality of first positioning units being fixed at the lower supporters, and protruding out of the lower supporters; a plurality of merging units being fixed at the upper supporters; (e) the upper molding plate being disposed opposite to the lower molding plate, and the upper supporters being disposed opposite to the lower supporters and contacting with the lower supporters respectively, and the part of the first positioning unit protruding out of the lower supporter is inserted into the merging unit during assembly.

DETAILED DESCRIPTION OF THE PREFERRED EMBODIMENTS

The technical contents and characteristics of the present invention will be apparent with the detailed description of a preferred embodiment accompanied with related drawings as follows. It should be noted that the drawings are provided for the purpose of illustrating the present invention, but not intended for limiting the scope of the invention. The element and structure in one of the embodiments with related drawing according to the present invention can integrate with one or more element and structure from other embodiment or drawing. Notably, for the sake of clarity, the drawings and detailed description in the present invention may omit the interpretation and explanation of the subject matter being known to a person having ordinary skill in the art, or unrelated to the present invention. The present invention provides several embodiments, however, all other embodiments obtained by a person having ordinary skill in the art without inventive labor should fall into the scope of the present invention.

Figure 1:
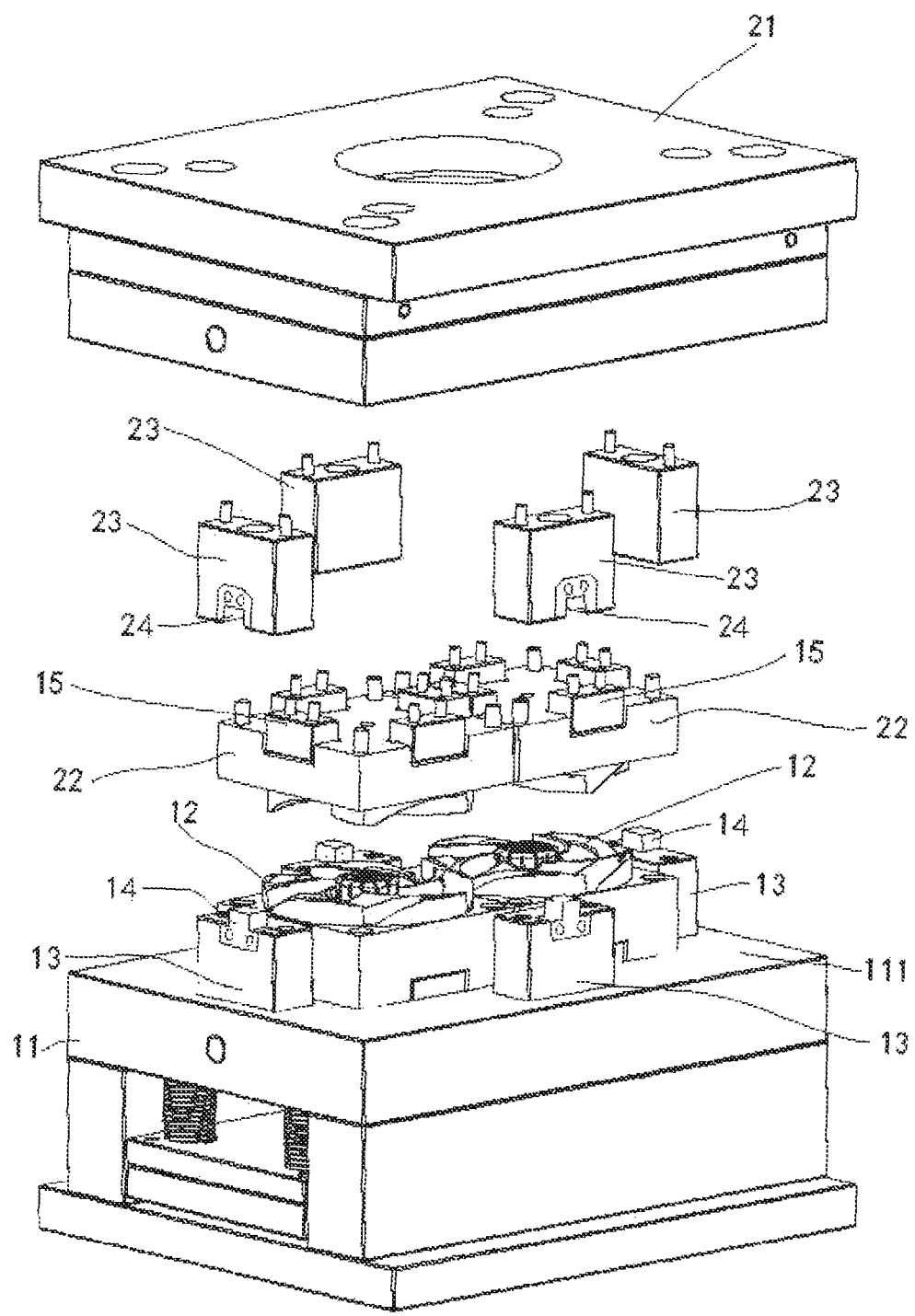
FIG. 1 demonstrates an exploded view of the mold structure according to the present invention.
Figure 2:
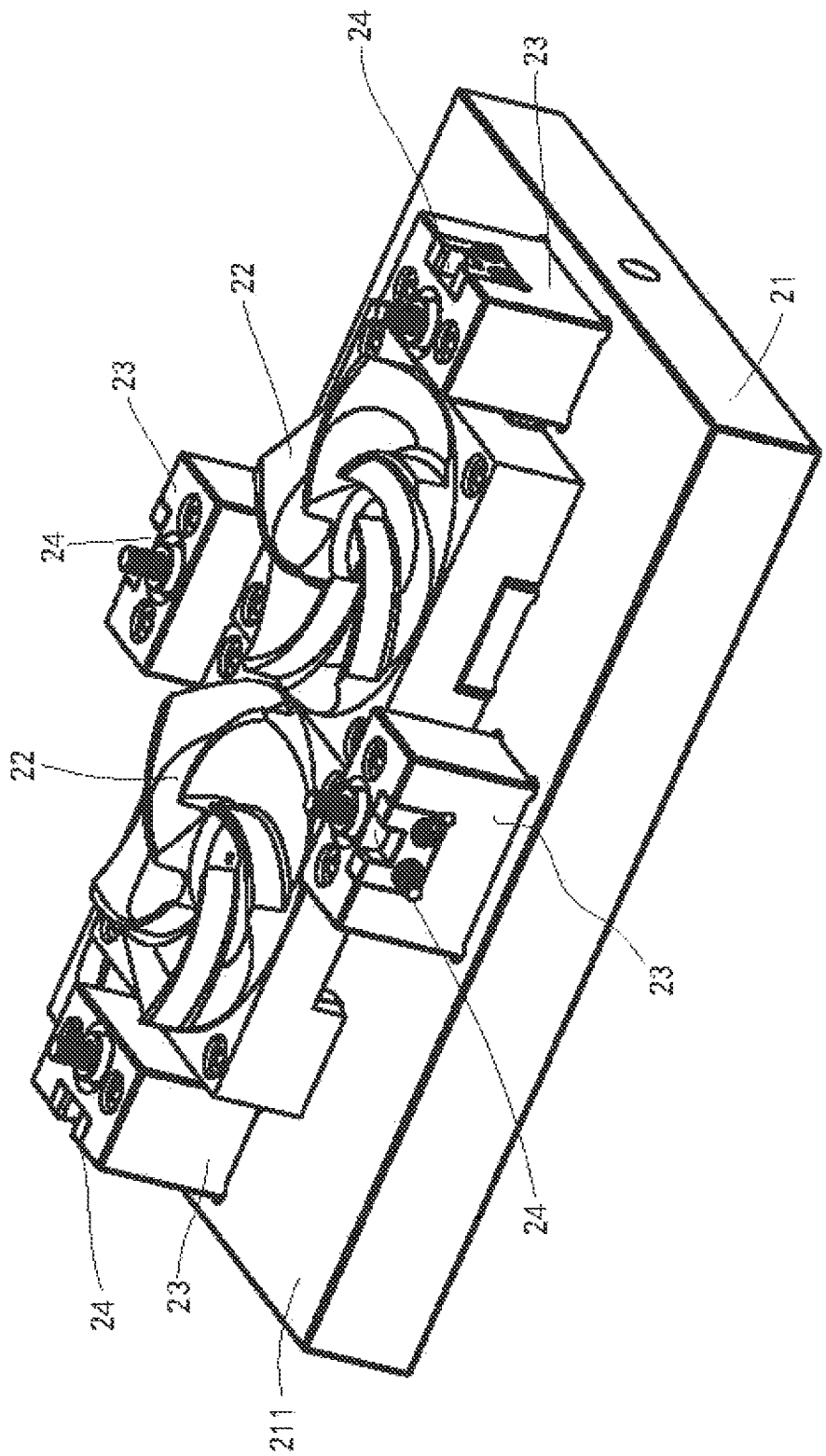
FIG. 2 demonstrates the upper molding plate according to the present invention.
Figure 3:
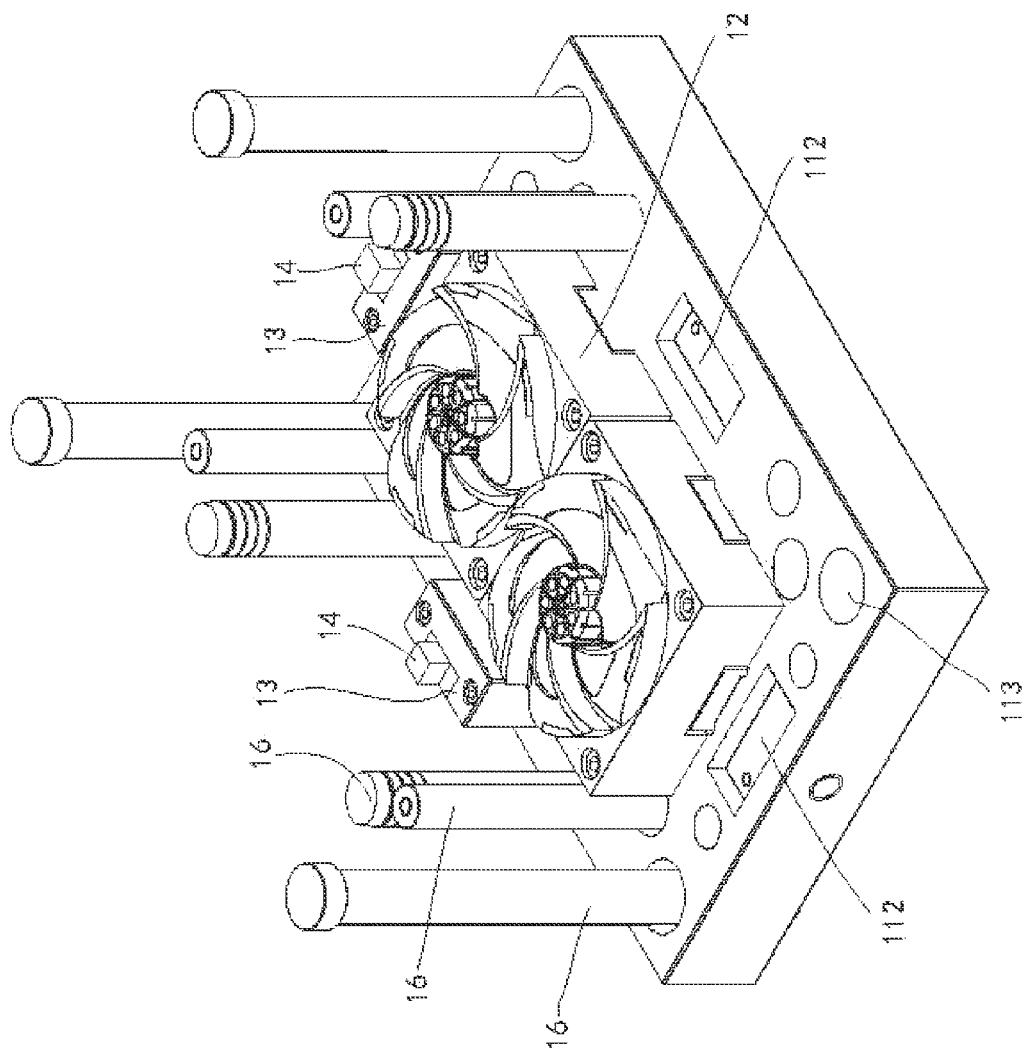
FIG. 3 demonstrates the first view of the lower molding plate according to the present invention.

Referring to FIG. 1, it demonstrates an exploded view of the mold structure according to the present invention. In FIG. 1, the present invention provides a mold structure, including a lower molding plate 11, at least one lower die core 12, a plurality of lower supporters 13, a plurality of first positioning units 14, an upper molding plate 21, at least one upper die core 22, a plurality of upper supporters 23 and a plurality of merging units 24, for simplifying process and reducing cost. Simultaneously referring to FIG. 2 and FIG. 3, wherein FIG. 2 demonstrates the upper molding plate according to the present invention, FIG. 3 demonstrates the first view of the lower molding plate according to the present invention. During the assembly, the lower die core 12 is disposed on the lower molding plate 11, passed through by a plurality of fasteners, and fixed on the lower molding plate 11 by driving the fasteners; the lower supporters 13 are disposed around the lower die core 12, passed through by a plurality of fasteners, and fixed on the lower molding plate 11 by driving the fasteners; the first positioning units 14 are fixed at the lower supporters 13, and protruding out of the lower supporters 13; Moreover, the upper die core 22 is disposed on the upper molding plate 21, passed through by a plurality of fasteners, fixed on the upper molding plate 21 by driving the fasteners; the upper supporters 23 are disposed around the upper die core 22, passed through by a plurality of fasteners, and fixed on the upper molding plate 21 through driving the fasteners; the merging units 24 are fixed at the upper supporters 23. During the assembly, the upper molding plate 21 corresponds to the lower molding plate 11, the upper die core 22 corresponds to the lower die core 12, the upper supporters 23 correspond to the lower supporters 13 and contact with the lower supporters, and the part of the first positioning unit 14 protruding out of the lower supporter 13 is inserted into the merging unit 24. In FIG. 1, two lower die cores 12 are disposed side by side, two upper die cores 22 are disposed side by side, and four lower supporters 13 are disposed around the two lower die cores 12, four upper supporters 23 are disposed around the two upper die cores 22; in alternative embodiment of the present invention, for example, only one lower die core 12 is disposed on the lower molding plate 11, four lower supporters 13 are disposed around the lower die core 12, also, one upper die core 22 corresponds to the lower die core 12 contrarily and is fixed on the upper molding plate 21, and four upper supporters 23 are disposed around the upper die core 22, and correspond to the lower supporters 13 respectively. When three lower die cores 12 are disposed on the lower molding plate 11, the number of the lower supporters 13 and the upper supporters 23 can be changed appropriately to dispose them around the lower die cores 12 and the upper die cores 22. In an alternative embodiment, position of the first positioning units 14 can be switched with that of the merging units 24, so the first positioning units 14 are fixed at the upper supporters 23, merging units 24 are fixed at the lower supporters 13, then the first positioning units 14 can still cooperate with merging units 24 when the lower molding plate 11 assembles to the upper molding plate 21. Please note that the "upper" and "lower" in present invention are just relative concept, not fixed space relation. The fastener in present invention generally means a mechanical component with fixing function by driving, for example, a screw.

The lower molding plate 11 has a lower surface 111. the lower die core 12 and the lower supporters 13 are passed through by a plurality of screws, and fixed on the lower surface 111 by driving the screws; the upper molding plate 21 has an upper surface 211, the upper die core 22 and the upper supporters 23 are passed through by a plurality of screws, and fixed on the upper surface 211 by driving the screws. In the best embodiment according to the present invention, the lower surface 111 has a plurality of screw hole, so the lower die core 12 and the lower supporters 13 can be passed through by the screws when disposed on the lower surface 111, and being fixed on the lower molding plate 11 by driving the screws. The combined height of the lower die core 12 and the upper die core 22 is equal to the combined height of the lower supporters 13 and the upper supporters 23, so the lower die core 12 and the upper die core 22 can be protected from compressional deformation through the supporters' support during the assembly. In practice, a lower supporter slot 112 can be formed appropriately on the lower molding plate 11 to position the lower supporter 13. Similarly, an upper supporter slot (not shown in figure) can be formed appropriately on the upper molding plate 21 to position the upper supporters 23. The lower supporter slot 112 is slightly below the lower surface 111. Forming the lower supporter slot 112 is not complex in process, which only requests minor process time, and most important, the lower supporter slot 112 is not a necessary matter in implementing the present invention. The lower molding plate 11 further has a plurality of guiding post holes 113, each guiding post hole 113 accommodates one guiding post 16, that is one end of the guiding post 16 is fixed in the guiding post hole 113. The guiding post holes 113 are formed at the four corners of the lower molding plate 11 with number adjustable as requested. The other end of the guiding post 16 is fixed on the upper molding plate 21. Then the lower molding plate 11 is guided by the guiding posts 16, and assembles to the upper molding plate 21.

The lower die core 12 is directly fixed on the lower molding plate 11, the upper die core 22 is directly fixed on the upper molding plate 21, and the lower molding plate 11 and the upper molding plate 21 can be manufactured without cavity. The die core is disposed on the surface of the molding plate directly, then driving screws from the front of the mold during assembly. When replacing, the screws are driven from the front of the mold, and the die core is taken apart from the surface of the molding plate. Therefore, the process can be simplified, cost can be reduced, and time can be saved under the design and structure of the present invention. The lower molding plate 11 is assembled cooperatively with the upper molding plate 21. The upper molding plate 21 is disposed opposite to the lower molding plate 11. The lower die core 12 is assembled cooperatively with the upper die core 22 as a complete mold for injection molding. The number of the lower die core 12 and the upper die core 22 can be adjusted appropriately. According to the present invention, at least one lower die core 12 and one upper die core 22 are included. Of course, a plurality of lower die cores 12 and upper die cores 22 can also be available.

Figure 4:
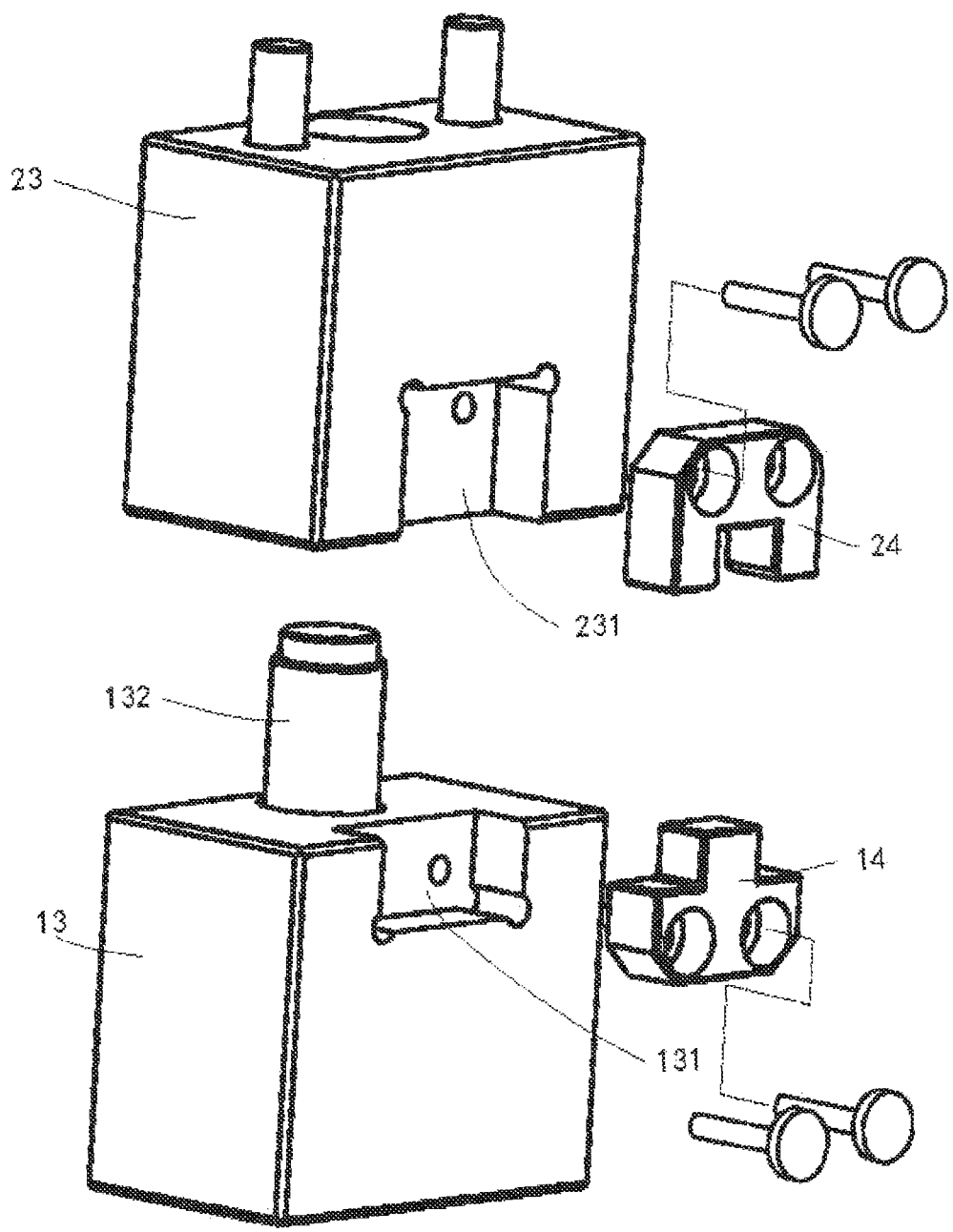
FIG. 4 demonstrates the first positioning unit and the merging unit according to the present invention.
Figure 5B:
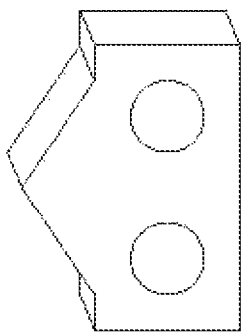
FIGS. 5A, 5B and 5C demonstrate various shapes of the first positioning unit according to the present invention.
Figure 5C:
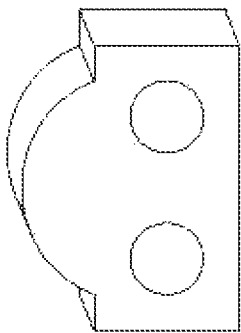
Figure 5A:
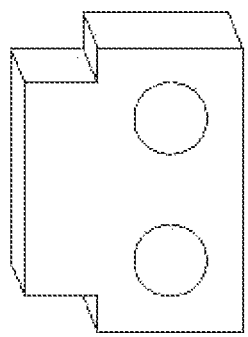

Please refer to FIG. 1 and FIG. 4, wherein FIG. 4 demonstrates the first positioning unit and the merging unit according to the present invention. In the present invention, at least two lower supporters 13 have a first accommodating slot 131. As shown in the figure, the present invention provides an embodiment, in which each of the four lower supporters 13 has a first accommodating slot 131. The first positioning unit 14 is disposed in the first accommodating slot 131, and a plurality of screws pass through the first positioning unit 14 from the side to fix the first positioning unit 14 at the lower supporters 13. In the present invention, at least two upper supporters 23 have a second accommodating slot 231. As shown in figure, the present invention provides an embodiment, in which each of the four upper supporters 23 has a second accommodating slot 231. The merging unit 24 is disposed in the second accommodating slot 231, and a plurality of screws pass through the merging unit 24 from the side to fix the merging unit 24 at the upper supporters 23. In the embodiment, the first positioning units 14 is a module, has a protruding part formed on top, the protruding part of the first positioning units 14 is used to position and inserted into the merging unit 24 as the lower molding plate 11 is assembled to the upper molding plate 21, so that the lower supporters 13 are assembled to the upper supporters 23. Please refer to FIGS. 5A, 5B and 5C, demonstrating three shapes of the first positioning unit according to the present invention, including rectangle, triangle and round shapes formed on the top of first positioning units 14. Three shapes can all be used to position, and are optional as requested. The merging unit 24 has three shapes including rectangle, triangle and round corresponding to the first positioning unit 14, so that the first positioning unit 14 can cooperate with the merging unit 24. In the present invention, the first positioning unit 14 has holes for screws to pass through, so the first positioning unit 14 can be fixed in the first accommodating slot 131 of the lower supporter 13 from the side. The merging unit 24 has holes for screws to pass through, so the merging unit 24 can be fixed in the second accommodating slot 231 of the upper supporters 23 from the side. Generally in practice, when the lower supporters 13 are assembled to the upper supporters 23, the position of the first positioning units 14 and the merging units 24 in the accommodating slot need to be slightly adjusted. In the present invention, the first positioning units 14 and the merging units 24 can be fixed from the side, so the screw can be unscrewed from the side, and the position of the first positioning units 14 and the merging units 24 can be adjusted and refixed when the lower supporters 13 are assembled to the upper supporters 23. Besides, as shown in FIG. 4, the lower supporter 13 further has parting lock 132, the parting lock 132 can lock the mold and control the three plate mold to open in turn by elasticity of spring, and the upper supporter 23 has a corresponding structure to cooperate with the lower supporters 13.

The die core of the present invention can also be positioned by a module. Please refer to FIG. 6 and FIG. 7, wherein the FIG. 6 demonstrates replacement of the mold structure according to the present invention, the FIG. 7 demonstrates the second view of the lower molding plate according to the present invention. The lower molding plate 11 further has a plurality of second positioning units 15 fixed by screws, the lower die core 12 has a plurality of second positioning slots 121 to accommodate the second positioning units 15. The lower molding plate 11 has numerous holes for screws, the screws pass through the second positioning units 15 from top, and fix the second positioning units 15 on the lower molding plate 11. Particularly, numerous positioning unit slots 114 can be formed on the lower molding plate 11 to position the second positioning units 15. Various shape can be formed on the top of the second positioning unit 15, the second positioning slot 121 is formed at the bottom of the lower die core 12 and cooperates with the shape of the second positioning unit 15. The second positioning unit 15 is formed to be convenient for the lower die core 12 to be positioned on the lower molding plate 11. When replacing the lower die core 12, it can be replaced directly without dismounting the second positioning unit 15. In this way, it is convenient to replace and position the lower die core 12. As shown in FIG. 1, symmetrically, the upper molding plate 21 can also has numerous second positioning units 15 fastened with the same disposition and fixing as the second positioning units 15 on the lower molding plate 11.

Figure 8:
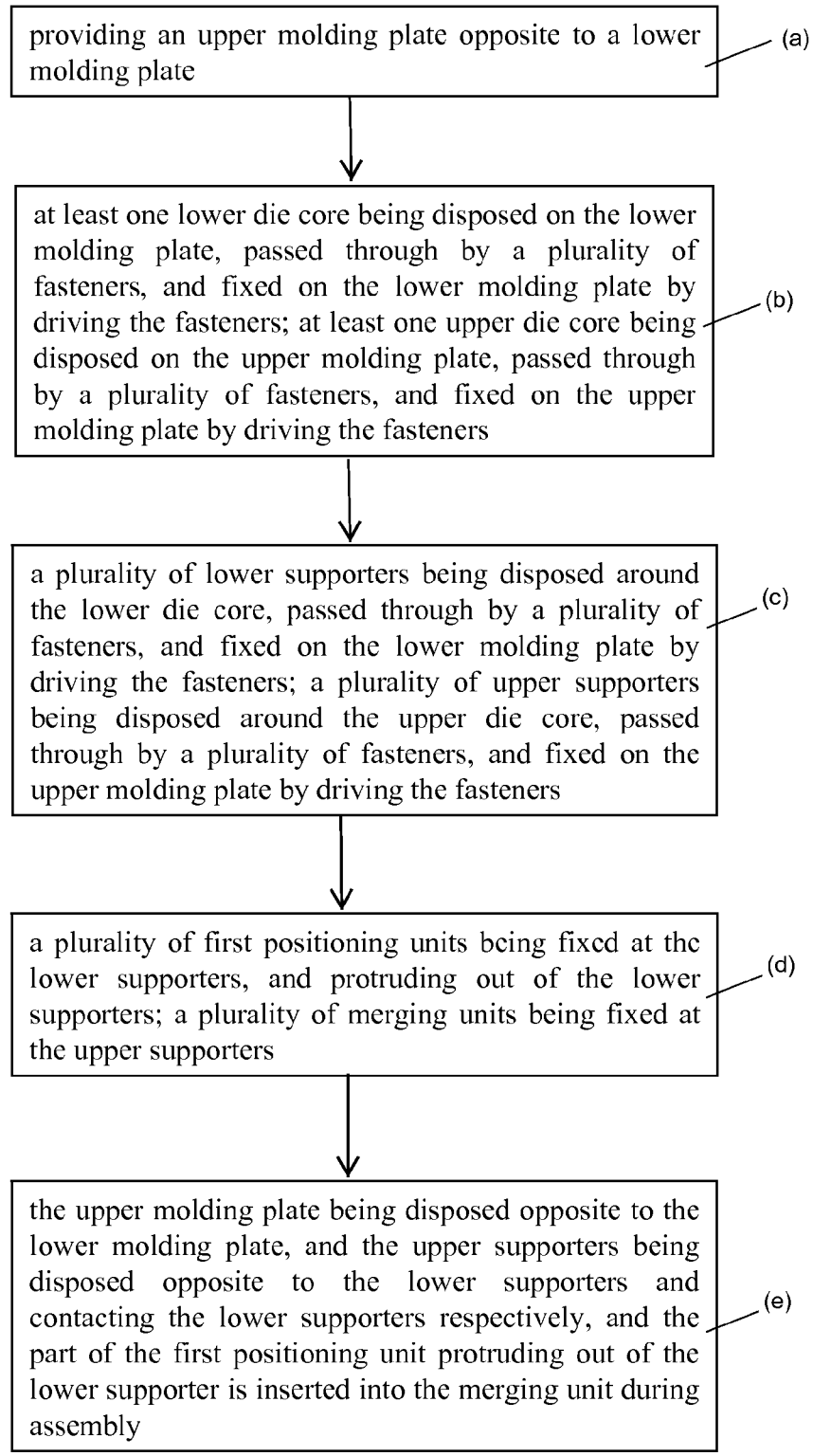
FIG. 8 demonstrates a replacement method of the mold structure according to the present invention.

The present invention provides a replacement method of mold structure, as shown in FIG. 8. The method includes: step (a), providing an upper molding plate opposite to a lower molding plate; in step (a), the lower molding plate has numerous guiding post holes for guiding posts and holes for fasteners, or as necessary, the lower supporter slots and the second positioning slots, so that the upper molding plate is formed as a structure corresponding to that of the lower molding plate; step (b), at least one lower die core being disposed on the lower molding plate, passed through by a plurality of fasteners, and fixed on the lower molding plate by driving the fasteners; at least one upper die core being disposed on the upper molding plate, passed through by a plurality of fasteners, and fixed on the upper molding plate by driving the fasteners; if necessary, the second positioning units can be disposed before step (b) and then disposing the lower die core and the upper die core; step (c), a plurality of lower supporters being disposed around the lower die core, passed through by a plurality of fasteners, and fixed on the lower molding plate by driving the fasteners; a plurality of upper supporters are disposed around the upper die core, passed through by a plurality of fasteners, and fixed on the upper molding plate by driving the fasteners; the lower supporters are around the lower die core, and the upper supporters are around the upper die core, so the lower die core and the upper die core can be fixed before the lower supporters and the upper supporters are fixed for operating convenience; the lower die core and the upper die core can be replaced without dismounting the lower supporters and the upper supporters during modification; step (d), a plurality of first positioning units being fixed at the lower supporters, and protruding out of the lower supporters; a plurality of merging units being fixed at the upper supporters; in the method of the present invention, it is convenient that the lower supporters and the upper supporters are fixed before the first positioning units and the merging units are fixed at the supporters, however, in practice, the first positioning unit can be fixed at the lower supporter before the lower supporter is fixed on the lower molding plate; Similarly, the merging units can be fixed at the upper supporter before the upper supporter is fixed on the upper molding plate; step (e), the upper molding plate being disposed opposite to the lower molding plate, and the upper supporters being disposed opposite to the lower supporters and contacting with the lower supporters respectively, the part of the first positioning unit protruding out of the lower supporter is inserted into the merging unit, and then injection molding can be carried out. In the structure of the present invention the die core can be replaced without replacing supporters, as long as the height of the die core keeps the same; the supporter can provide certain supporting, however, the supporters need to be replaced simultaneously as the height of the die core changes after replacement.

Figure 6:
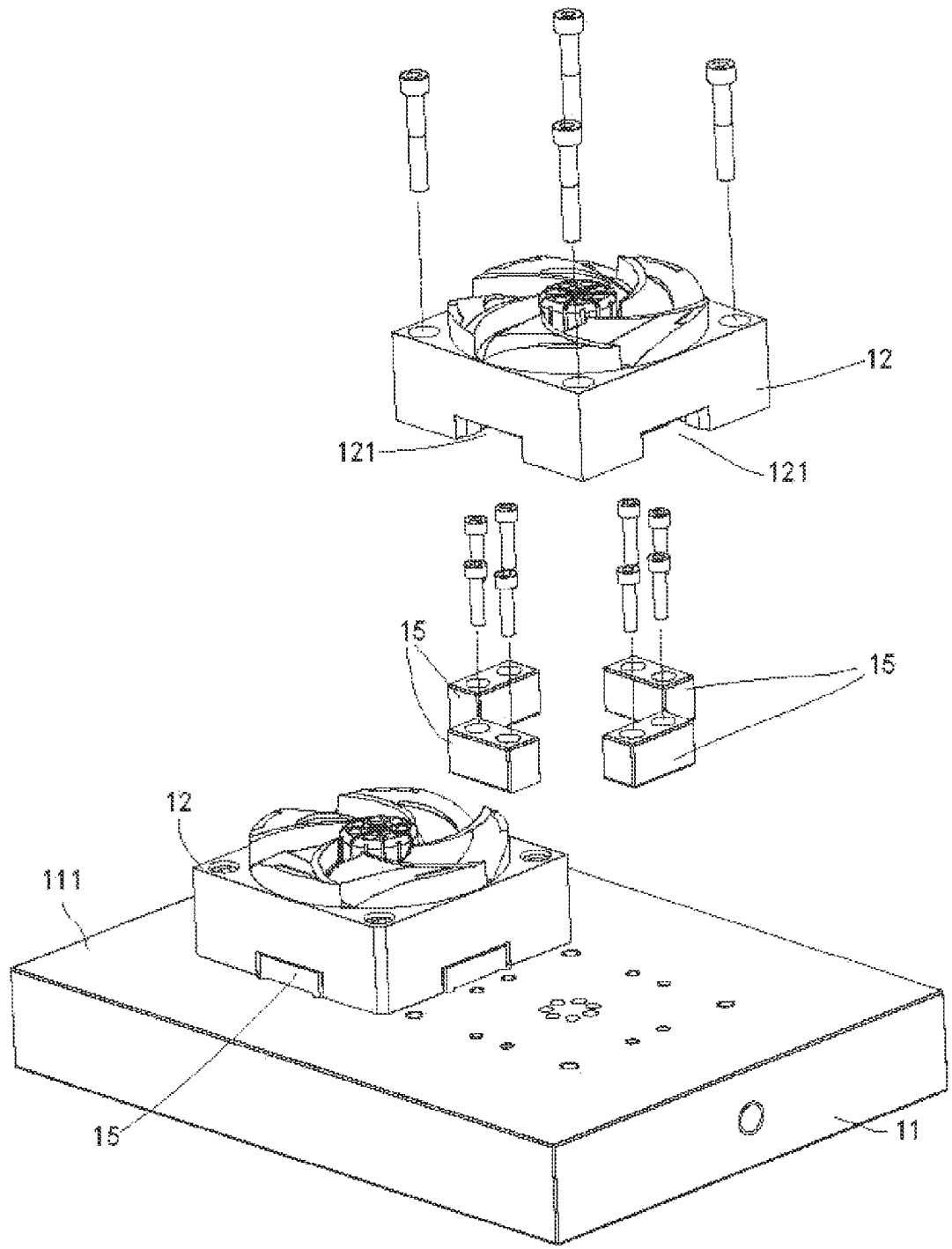
FIG. 6 demonstrates replacement of the mold structure according to the present invention.
Figure 7:
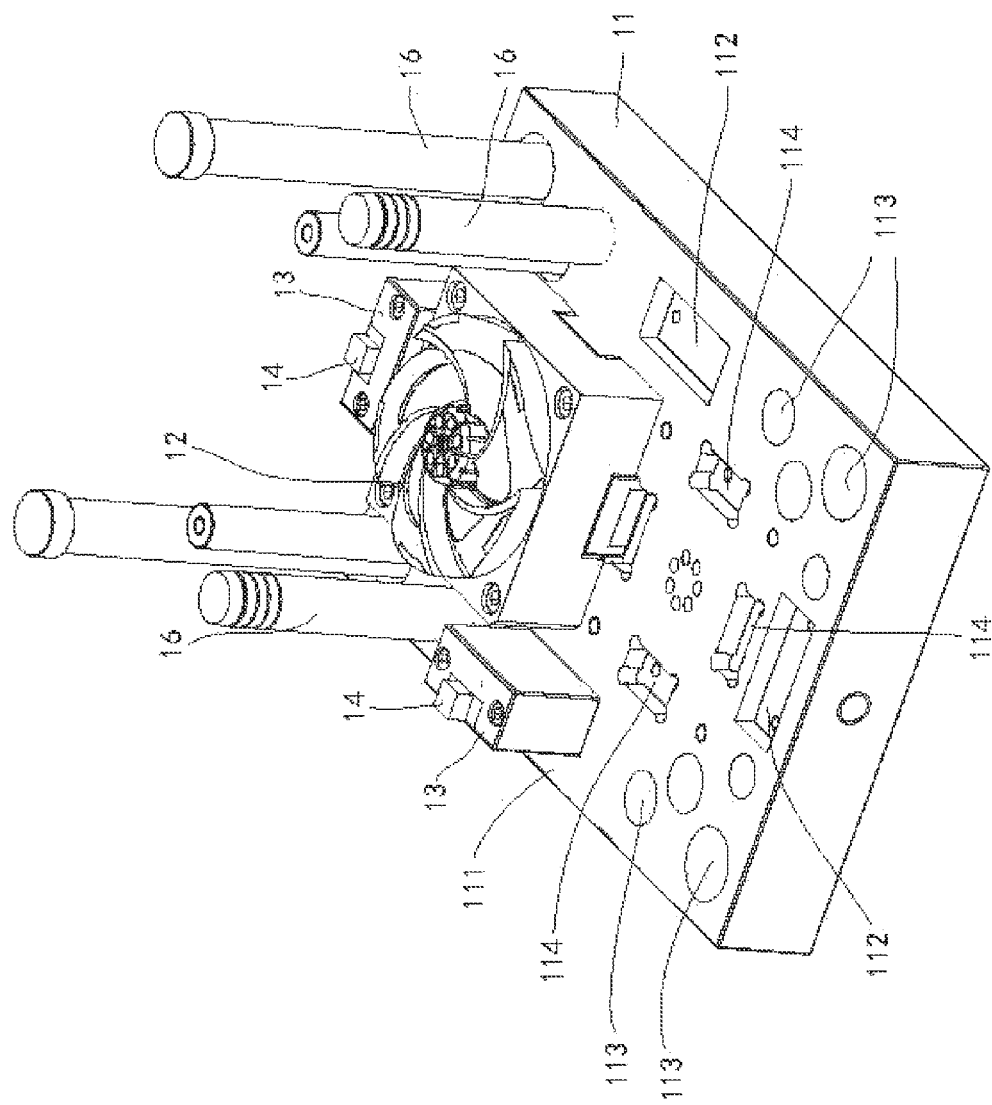
FIG. 7 demonstrates the second view of the lower molding plate according to the present invention.

As shown in FIG. 6 and FIG. 7, the screws of the lower supporters 13 and the upper supporters 23 are unscrewed directly when replacing mold, and the lower supporters 13 are taken apart from the lower molding plate 11, the upper supporters 23 are taken apart from the upper molding plate 21, then the screws of the lower die core 12 and upper die core 22 are unscrewed, and the lower die core 12 is taken apart from the lower molding plate 11, the upper die core 22 is taken apart from the upper molding plate 21 as well. The first positioning units 14 are not necessary to be taken apart, only need to be replaced as requested. The guiding posts 16 may hinder or block replacement, so the guiding posts 16 can be taken apart partially or removed for replacement.

Figure 9:
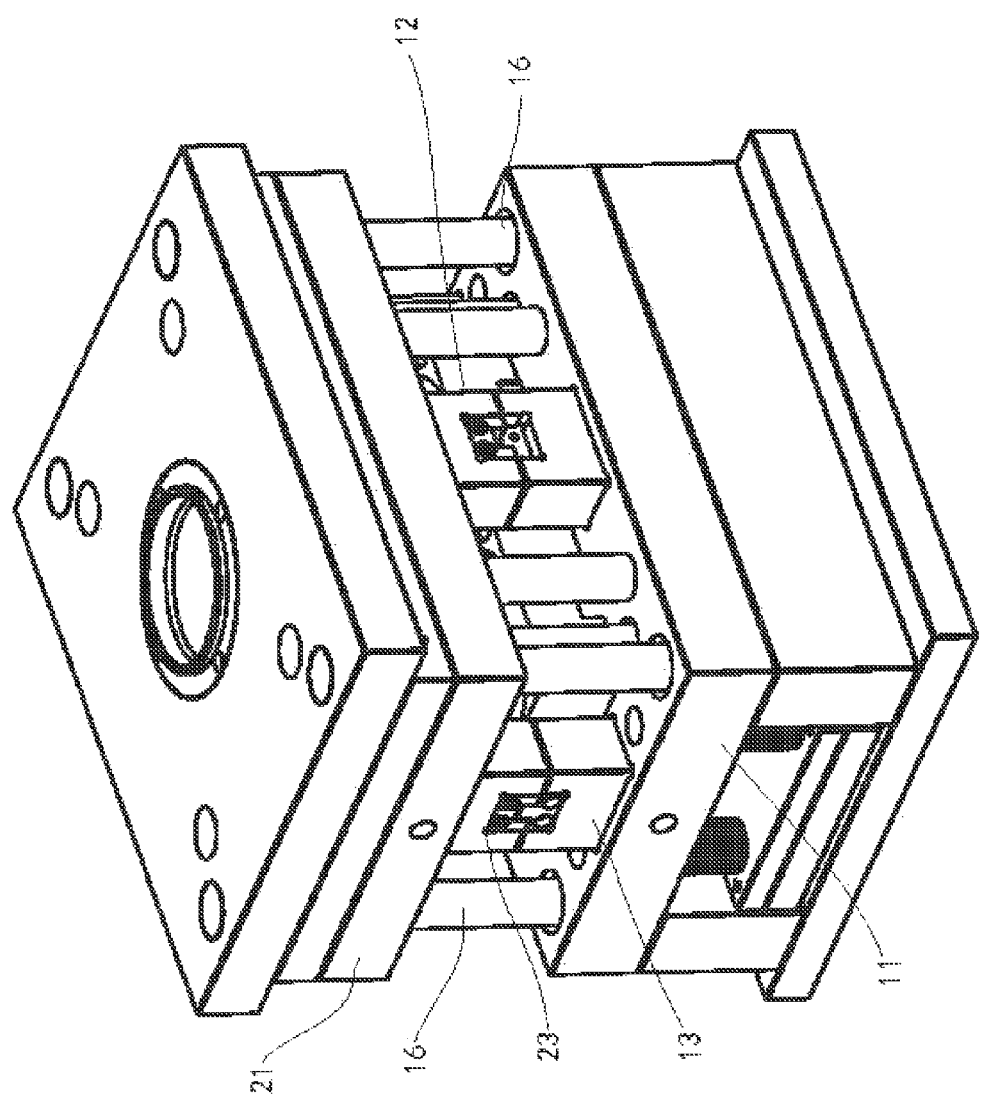
FIG. 9 demonstrates the assembly of the mold structure according to the present invention.

The above description shows the replacement of mold of the present invention. Please refer to FIG. 1 and FIG. 9, wherein the FIG. 9 demonstrates the assembly of the mold structure according to the present invention. The assembly of the lower molding plate 11 is followed by the assembly of the upper molding plate 21. The upper molding plate 21 has a corresponding upper die core 22 and numerous upper supporters, and the lower die core 12 is assembled opposite to the upper die core 22 as a complete mold, so the mold can be used for injection molding. The guiding post 16 is used to guide the molding plate as the lower molding plate 11 is assembled to the upper molding plate 21, so that the lower molding plate 11 and the upper molding plate 21 can be assembled correctly, wherein the number of the guiding posts can be adjusted as request. In the present invention, the height of the lower die core 12 cooperating with that of the upper die core 22 means the height of the lower supporter 13 cooperating with that of the upper supporters 23. In this way, if the height is changed after replacing the lower die core 12 and the upper die core 22, the lower supporter 13 and the upper supporter 23 should also be replaced, otherwise the difference of height may cause damage to the lower die core 12 and the upper die core 22, and affect product quality after injection molding.

The mold structure and the replacement method thereof according to the present invention improves the structure, disposing, fixing, and positioning of the die core and the supporters, provides mold structure and keeps certain favorable conditions to the manufacturing, including high precision as request in the injection molding and convenience for process. The molding plate of the present invention has numerous holes for fasteners to fix die core without additional process to form cavity, which request high precision to accommodate the die core, and thus process time can be reduced. Moreover, in the present invention, the fasteners are unscrewed directly from top of the die core when replacing the die core, and the die core can be taken apart. In conventional mold, the fasteners fix the die core from the back of the molding plate, and the die core has to be taken apart after dissembling the molding plate. Thus, the present invention provides a better method and structure to the conventional die core and is with higher quality. As a result, the mold structure of the present invention provides an accurate positioning method to fix the die core and the supporters, also provides replacement method of the mold. Time of about 20 minutes can be saved in each replacement than conventional method, and time of about 30 minutes can be saved in each mold testing or modification because the die core can be taken apart directly. Therefore, the procedure requested in mold testing of conventional mold is improved, the process time is greatly reduced, and the cost is saved.

In the structure and method of the present invention, apparently, the component and step can be separated, combined, or combined after separation. Those matters of separated or combined after separation can be regarded as equivalent embodiment of the present invention. Also, in the detail description relating to the practice of the present invention from above, one feature demonstrated in the practice of the present invention can be used in one or more practices with the same or relevant skills, combined with the feature in other practice, or replaced the feature in other practice.

It can be seen with emphasis, the term "including" or "comprising" used in the present invention shows the presence of feature, element, step or component, but never excludes one or more presences of feature, element, step or component.

Although various embodiments and advantages of the invention have been described above, it should be understood, various changes, replacements and alterations is available in the spirit or scope of the present invention without departing from the claims that follow. Moreover, the scope of the present invention should not be limited by the processes, devices, means, methods and steps of the embodiment in the specification. The person who has certain skill in this art can easily understand from the disclosure of the present invention, and exercise the processes, devices, means, methods and steps based on the same result with the development in present or future meet the spirit of the invention, or based on the same function as the embodiment according to the present invention. Therefore, the scope of the claims in the present invention should include the processes, devices, means, methods and steps.

What is claimed is:
1. A mold structure, including:
   a lower molding plate;
   at least one lower die core, being passed through by a plurality of fasteners, and fixed on the lower molding plate by driving the fasteners;
   a plurality of lower supporters, being disposed around the lower die core, passed through by a plurality of fasteners, and fixed on the lower molding plate by driving the fasteners;
   a plurality of first positioning units, each being fixed at the lower supporters, and protruding out of the lower supporters;

an upper molding plate, disposed opposite to the lower molding plate;

at least one upper die core, being passed through by a plurality of fasteners, fixed on the upper molding plate by driving the fasteners, and disposed opposite to the lower die core;

a plurality of upper supporters, being disposed around the upper die core, passed through by a plurality of fasteners, and fixed on the upper molding plate by driving the fasteners; and a plurality of merging units, each being fixed at the upper supporters;

wherein the upper supporters correspond to the lower supporters and contact with the lower supporters, and the part of the first positioning unit protruding out of the lower supporter is inserted into the merging unit during assembly.

2. The mold structure of claim 1, wherein the lower molding plate has a lower surface, the lower die core is passed through by a plurality of fasteners, and fixed on the lower surface by driving the fasteners; the lower supporter is passed through by a plurality of fasteners, and fixed on the lower surface by driving the fasteners.

3. The mold structure of claim 1, wherein the upper molding plate has an upper surface, the upper die core is passed through by a plurality of fasteners, and fixed on the upper surface by driving the fasteners; the upper supporter is passed through by a plurality of fasteners, and fixed on the upper surface by driving the fasteners.

4. The mold structure of claim 1, wherein at least two lower supporters have a first accommodating slot, the first positioning unit is disposed in the first accommodating slot, and a plurality of fasteners pass through the first positioning unit from a side to fix the first positioning unit in the first accommodating slot.

5. The mold structure of claim 1, wherein at least two upper supporters have a second accommodating slot, the merging unit is disposed in the second accommodating slot, and a plurality of fasteners pass through the merging unit from a side to fix the merging unit in the second accommodating slot.

6. The mold structure of claim 1, wherein the lower molding plate further has a plurality of second positioning units fixed by fasteners; the upper molding plate further has a plurality of second positioning units fixed by fasteners.

7. A method of replacing a mold structure, including:
(a) providing an upper molding plate opposite to a lower molding plate;
(b) at least one lower die core being disposed on the lower molding plate, passed through by a plurality of fasteners, and fixed on the lower molding plate by driving the fasteners; at least one upper die core being disposed on the upper molding plate, passed through by a plurality of fasteners, and fixed on the upper molding plate by driving the fasteners;
(c) a plurality of lower supporters being disposed around the lower die core, passed through by a plurality of fasteners, and fixed on the lower molding plate by driving the fasteners; a plurality of upper supporters being disposed around the upper die core, passed through by a plurality of fasteners, and fixed on the upper molding plate by driving the fasteners;
(d) a plurality of first positioning units being fixed at the lower supporters, and protruding out of the lower supporters; a plurality of merging units being fixed at the upper supporters;
(e) the upper molding plate being disposed opposite to the lower molding plate, and the upper supporters being disposed opposite to the lower supporters and contacting with the lower supporters respectively, and the part of the first positioning unit protruding out of the lower supporter being inserted into the merging unit.

8. The replacement method of mold structure of claim 7, wherein the lower molding plate has a lower surface, in step (b), the lower die core is passed through by a plurality of fasteners, and fixed on the lower surface by driving the fasteners; in step (c), the lower supporter is passed through by a plurality of fasteners, and fixed on the lower surface by driving the fasteners.

9. The replacement method of mold structure of claim 7, wherein the upper molding plate has an upper surface, in step (b), the upper die core is passed through by a plurality of fasteners, and fixed on the upper surface by driving the fasteners; in step (c), the upper supporter is passed through by a plurality of fasteners, and fixed on the upper surface by driving the fasteners.

10. The replacement method of mold structure of claim 7, wherein at least two lower supporters have a first accommodating slot, in step (d), the first positioning unit is disposed in the first accommodating slot, and a plurality of fasteners pass through the first positioning unit from a side to fix the first positioning unit in the first accommodating slot.

11. The replacement method of mold structure of claim 7, wherein at least two upper supporters have a second accommodating slot, in step (d), the merging unit is disposed in the second accommodating slot, and a plurality of fasteners pass through the merging unit from a side to fix the merging unit in the second accommodating slot.

12. The replacement method of mold structure of claim 7, wherein in step (b), the lower molding plate further has a plurality of second positioning units fixed by fasteners; the upper molding plate further has a plurality of second positioning units fixed by fasteners.

* * * * *